United States Patent
Pawar et al.

(10) Patent No.: US 9,906,338 B1
(45) Date of Patent: Feb. 27, 2018

(54) DYNAMIC BASE STATION SELECTION BASED ON EXTENT TO WHICH A BASE STATION CAN PROVIDE MULTI-USER MULTIPLE-INPUT MULTIPLE-OUTPUT (MU-MIMO) SERVICE

(71) Applicant: Sprint Spectrum L.P., Overland Park, KS (US)

(72) Inventors: Hemanth B. Pawar, Brambleton, VA (US); Shilpa K. Srinivas, Brambleton, VA (US); Krishna Sitaram, Chantilly, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 236 days.

(21) Appl. No.: 14/757,985

(22) Filed: Dec. 24, 2015

(51) Int. Cl.
*H04B 7/04* (2017.01)
*H04L 5/00* (2006.01)
(Continued)

(52) U.S. Cl.
CPC ......... *H04L 5/0035* (2013.01); *H04B 7/0452* (2013.01); *H04L 5/0076* (2013.01); *H04W 4/08* (2013.01); *H04W 8/205* (2013.01); *H04W 16/16* (2013.01); *H04W 24/02* (2013.01); *H04W 28/0252* (2013.01); *H04W 36/0094* (2013.01);
(Continued)

(58) Field of Classification Search
CPC ............. H04B 7/0413–7/0486; H04B 7/0621–7/0634; H04L 5/003–5/0098; H04W 4/06; H04W 4/08; H04W 8/18–8/245; H04W 16/02–16/16; H04W 24/02; H04W 24/04; H04W 24/10; H04W 28/0231–28/0263; H04W 36/0005–36/385; H04W 40/22–40/36; H04W 48/02–48/06; H04W 48/16–48/20; H04W 72/0406–72/10; H04W 72/1205–72/14; H04W 74/02; H04W 74/04; H04W 74/06; H04W 76/002; H04W 76/025; H04W 76/026; H04W 76/028; H04W 76/045; H04W 76/064; H04W 76/066; H04W 84/04–84/047; H04W 88/04–88/12; H04W 92/10; H04W 92/12; H04W 92/16–92/22
See application file for complete search history.

(56) References Cited

U.S. PATENT DOCUMENTS

2016/0037550 A1* 2/2016 Barabell .............. H04B 17/318
455/450

OTHER PUBLICATIONS

Liu, L., Chen, R., Geirhofer, S, Sayana K., Shi, Z., S., & Zhou, Y., "Downlink MIMO in LTE-Advanced: SU-MIMO vs. MU-MIMO." Communications Magazine, 50(2), pp. 140-147, Feb. 2012.
(Continued)

*Primary Examiner* — Timothy J Weidner

(57) ABSTRACT

A method and system for controlling which of a plurality of base stations will serve a WCD. Per the disclosure, a base station is selected from the plurality based at least on an extent to which the selected base station can provide MU-MIMO service efficiently to the WCDs that the selected base station is serving. Thus, the base station that will serve the WCD could be selected for effectively serving a lower quantity of WCDs (if MU-MIMO service is enabled) than other base stations of the plurality. And the WCD could then receive service from the selected base station.

20 Claims, 4 Drawing Sheets

(51) Int. Cl.

| | | |
|---|---|---|
| *H04W 4/08* | (2009.01) | |
| *H04W 8/20* | (2009.01) | |
| *H04W 16/16* | (2009.01) | |
| *H04W 24/02* | (2009.01) | |
| *H04W 28/02* | (2009.01) | |
| *H04W 36/08* | (2009.01) | |
| *H04W 40/22* | (2009.01) | |
| *H04W 48/20* | (2009.01) | |
| *H04W 72/04* | (2009.01) | |
| *H04W 74/02* | (2009.01) | |
| *H04W 76/02* | (2009.01) | |
| *H04W 84/08* | (2009.01) | |
| *H04W 88/04* | (2009.01) | |
| *H04W 88/08* | (2009.01) | |
| *H04W 92/10* | (2009.01) | |
| *H04B 7/0452* | (2017.01) | |
| *H04W 48/06* | (2009.01) | |
| *H04W 36/00* | (2009.01) | |
| *H04W 84/04* | (2009.01) | |

(52) U.S. Cl.
CPC ............ *H04W 36/08* (2013.01); *H04W 40/22* (2013.01); *H04W 48/06* (2013.01); *H04W 48/20* (2013.01); *H04W 72/0486* (2013.01); *H04W 74/02* (2013.01); *H04W 76/028* (2013.01); *H04W 84/045* (2013.01); *H04W 88/04* (2013.01); *H04W 88/08* (2013.01); *H04W 92/10* (2013.01)

(56) References Cited

OTHER PUBLICATIONS

Natarajan, B., Arulselvan, N., Kalyanasundaram, S., Kroener, H., & Agrawal, R., "Channel Orthogonality and Utility-Based UE Pairing Schemes for LTE Uplink MU-MIMO." Vehicular Technology Conference (VTC FALL), pp. 1-5, Sep. 2013.

Duplicy, J., Badic, B., Balraj, R., Ghaffar, R., Horv'ath, P., Kaltenberger, F., Knopp, R., Kov'acs, I., Nguyen, H., Tandur, D., & Vivier, G., "MU-MIMO in LTE Systems." EURASIP Journal on Wireless Communications and Networking 2011, 2011:496763, Mar. 2011.

Bhamri, A., Kaltenberger, F., Knopp, R., & Hamalainen, J. "Improving MU-MIMO Performance in LTE-(Advanced) by Efficiently Exploiting Feedback Resources and through Dynamic Scheduling." Wireless Communications and Networking Conference, pp. 563-567, Apr. 2013.

Ghaffer, R. & Ho, P., "LTE-Advanced Multi-User MIMO: Improved Feedback and Precoding Design." Vehicular Technology Conference (VTC Fall), pp. 1-5, Sep. 2012.

* cited by examiner

DYNAMIC BASE STATION SELECTION BASED ON EXTENT TO WHICH A BASE STATION CAN PROVIDE MULTI-USER MULTIPLE-INPUT MULTIPLE-OUTPUT (MU-MIMO) SERVICE

BACKGROUND

Unless otherwise indicated herein, the description provided in this section is not itself prior art to the claims and is not admitted to be prior art by inclusion in this section.

A typical wireless network includes a number of base stations each radiating to provide coverage in which to serve wireless communication devices (WCDs) such as cell phones, tablet computers, tracking devices, embedded wireless modules, and other wirelessly equipped devices. In turn, each base station may be coupled with network infrastructure that provides connectivity with one or more transport networks, such as the public switched telephone network (PSTN) and/or the Internet for instance. With this arrangement, a WCD within coverage of the wireless network may engage in air interface communication with a base station and may thereby communicate via the base station with various remote network entities or with other WCDs served by the wireless network.

Further, a wireless network may operate in accordance with a particular air interface protocol (i.e., radio access technology), with communications from the base stations to WCDs defining a downlink or forward link and communications from the WCDs to the base stations defining an uplink or reverse link. Examples of existing air interface protocols include, without limitation, wireless wide area network (WWAN) protocols such as Orthogonal Frequency Division Multiple Access (OFDMA) (e.g., Long Term Evolution (LTE) and Wireless Interoperability for Microwave Access (WiMAX)), Code Division Multiple Access (CDMA) (e.g., 1×RTT and 1×EV-DO), and Global System for Mobile Communications (GSM), and wireless local area network (WLAN) protocols such as IEEE 802.11 (WIFI), BLUETOOTH, and others. Each protocol may define its own procedures for registration of WCDs, initiation of communications, handover between coverage areas, and/or other functions.

In practice, a base station may provide service to WCDs on carrier frequencies or "carriers." Each carrier could be a time division duplex (TDD) carrier that defines a single frequency channel multiplexed over time between downlink and uplink use, or a frequency division duplex (FDD) carrier that defines two separate frequency channels, one for downlink communication and one for uplink communication. Each frequency channel of a carrier may then occupy a particular frequency bandwidth (e.g., 1.4 MHz, 3 MHz, 5 MHz, 10 MHz, or 20 MHz) defining a range of frequency at a particular position (e.g., defined by a center frequency) in a radio frequency band (e.g., in the 800 MHz band, the 1.9 GHz band, or the 2.5 GHz band).

For instance, in an LTE system, the air interface is divided over time into frames and sub-frames each defining two slots, and the uplink and downlink channels are each divided over their frequency bandwidth into sub-carriers that are grouped within each slot or sub-frame into physical resource blocks (PRBs). When a WCD is positioned within coverage of a base station, the WCD may register or "attach" with the base station on a particular carrier on which the base station provides service, and the base station may then serve the WCD on that carrier, scheduling particular downlink and uplink PRBs on that carrier to carry data communications to and from the WCD. Further, the base station and WCD may modulate their air interface data communications according to a modulation scheme selected based on quality of the WCD's coverage, such as with a higher-order modulation scheme when the WCD is in better coverage of the base station and with a lower-order modulation scheme when the WCD is in worse coverage.

In such an LTE system, for instance, when the base station has data to transmit to the WCD, the base station may select certain downlink PRBs to carry the data and may determine a modulation scheme for transmission on those PRBs, and the base station may then (i) transmit to the WCD a scheduling directive instructing the WCD to receive the data on the scheduled PRBs using the determined modulation scheme, and (ii) transmit the data on the indicated downlink PRBs using the determined modulation scheme. Likewise, when the base station receives from the WCD a request for the WCD to transmit data to the base station, the base station may select certain uplink PRBs to carry the data, and the base station may then (i) transmit to the WCD a scheduling directive instructing the WCD to transmit the data on the scheduled PRBs using a particular modulation scheme and (ii) receive the transmission from the WCD accordingly.

With such an arrangement, the overall bandwidth of the carriers on which a base station is configured to serve WCDs may pose an effective limit on the number of WCDs that the base station can serve, as the overall bandwidth would define only a limited number of PRBs per carrier. And the number of WCDs that the base station can serve may be further limited based on air interface conditions between the base station and each served WCD, as poor air interface conditions may necessitate assigning more PRBs to the served WCDs.

One way to help overcome this limitation is to have a base station serve multiple WCDs on the same PRBs at once, providing what is known as multi-user multiple-input multiple-output (MU-MIMO) service. With MU-MIMO service, the base station may share PRBs among a group of WCDs to increase the effective number of PRBs available to the base station by scheduling uplink or downlink communication to each WCD of the group on the same PRBs.

To facilitate this in practice, a base station configured to support MU-MIMO service typically uses multiple antennas for both transmission and reception. With multiple antennas, the base station can employ spatial multiplexing to concurrently transmit multiple downlink data streams to multiple spatially distributed WCDs on the same shared PRBs by using a different antenna for each data stream. For instance, the base station may determine appropriate beamforming patterns or directions for each antenna to mitigate interference between the downlink data streams transmitted concurrently on the shared PRBs. Likewise, the base station can employ spatial multiplexing to separate a combination of uplink data streams received from spatially distributed WCDs assigned to the same shared PRBs. For instance, although the uplink data streams are transmitted concurrently by the WCDs on the shared PRBs, each antenna may receive the uplink data streams from different directions or with different time lags due to the spatial distribution of the WCDs, and the base station may use these differences as "spatial signatures" to separate the uplink data streams.

Ideally, to maximize the number of PRBs available for scheduling to its served WCDs, a base station could provide MU-MIMO service to all the WCDs. Unfortunately, however, doing so might reduce the overall throughput of the base station due to interference caused by spatial multiplexing. By way of example, if a group of WCDs are not appropriately distributed spatially, interference between data communicated with the WCDs on shared PRBs may reduce the reliability of the air interface connections between the WCDs and the base station.

To efficiently serve WCDs, the base station may decide which WCDs the base station should group or "pair" for sharing PRBs among each other. For instance, if enabling MU-MIMO service for a group of WCDs may contribute to a throughput gain or other efficiency improvement for the base station, then the base station may commit additional signal processing overhead (e.g., for separating combined signals, etc.) associated with enabling MU-MIMO service for the group. Whereas, for instance, if enabling MU-MIMO service may contribute to deterioration and/or insignificant improvement of the base station's efficiency, then the base station may perhaps serve the group of WCDs without MU-MIMO service.

To facilitate this, the base station may keep track of each served WCD's channel state, such as the WCD's signal strength and quality, and may adjust or set the base station's MU-MIMO service accordingly. For instance, if a group of WCDs have good channel states for a particular channel, the base station may identify the group of WCDs as candidates for receiving MU-MIMO service efficiently using PRBs in that particular channel, as the good channel states may indicate low interference in that particular channel between the group of WCDs.

To do this in practice, for instance, the base station could transmit a reference signal to some or all of its served WCDs using downlink PRBs in a particular channel. Each WCD may then receive and decode the reference signal, establish one or more channel state metrics indicating signal strength and quality measurements for the received reference signal, and generate and transmit one or more associated channel state reports to the base station on uplink signaling channels and/or uplink traffic. The base station could thus receive these reports and keep a record of each WCD's latest indicated channel state, so that the base station may identify which of its served WCDs have sufficiently high signal strength and quality for receiving MU-MIMO service efficiently using PRBs in that particular channel.

Therefore, even with MU-MIMO service, the effective number of WCDs that a base station can serve may depend on how many of the served WCDs meet certain MU-MIMO efficiency criteria, such as threshold high signal strength and quality for example.

Overview

Ideally, when a WCD is within coverage of multiple base stations, the WCD could be served by the base station having the most reliable air interface conditions for serving the WCD. Unfortunately, however, this service arrangement can contribute to high load on the base station if the base station is already serving a high number of WCDs, which could present issues for communication with the base station's served WCDs. For instance, if the served WCDs request additional PRBs, the base station's carriers could become congested, which could prevent the base station from providing optimal rates of data communication to the served WCDs. On the other hand, for instance, another base station serving fewer WCDs but having slightly less reliable air interface conditions for serving the WCD could still serve the WCD, while being less likely to become congested if its served WCDs request additional PRBs.

Further, in some scenarios, the likelihood that the base station's carriers could become congested may increase if the WCD at issue is configured to provide at least one other device with connectivity to the base station. By way of example, if the WCD is operating as a relay between the base station and one or more other devices, such as if the WCD is operating as a hotspot or device-to-device intermediary or the like, then the WCD may request PRBs for the one or more connected devices as well as possibly PRBs for the WCD itself. And the base station's carriers could thus be even more likely to become congested. Consequently, an improvement is desired.

The present disclosure provides for controlling which base station will serve a WCD based at least on a consideration of the extent to which the base station can provide MU-MIMO service to its served WCDs. The theory here is that, even if a base station is actually serving a certain number of WCDs, the base station may be effectively serving fewer WCDs if the base station enables MU-MIMO service to share PRBs among WCDs that meet certain MU-MIMO efficiency criteria.

As a specific example of this, consider a scenario where the base station receives scheduling requests for serving two WCDs with ten PRBs each. If the two WCDs meet the MU-MIMO efficiency criteria, the base station could enable MU-MIMO service for these two WCDs and schedule the same ten PRBs to both WCDs concurrently. As a result, the base station may be effectively scheduling the same number of PRBs to two WCDs that it would otherwise schedule to only one WCD without the MU-MIMO service. Thus, in this scenario, the base station may be deemed to be effectively serving one WCD even though it is actually serving two WCDs. As a variation of this scenario, even if the base station decides to schedule more than ten PRBs for serving the two WCDs to mitigate interference caused by spatial multiplexing, the base station may still be deemed to be effectively serving fewer than two WCDs if the number of scheduled PRBs is less than twenty.

In accordance with the disclosure, when a WCD is within coverage of multiple base stations, the base station that will serve the WCD is selected based at least on an extent to which the base station is serving WCDs that meet at least one predefined MU-MIMO efficiency sharing criterion.

The extent at issue in this process could be a question of how many WCDs each base station is actually serving, and how many of those WCDs the base station can serve with MU-MIMO efficiently. As such, in various embodiments herein, the disclosure provides for determining effective quantities of WCDs that each base station is serving, and selecting the base station that will serve the WCD. This selection could be based at least on the selected base station having a lower determined effective quantity than the effective quantities determined for the other base stations. For instance, the effective quantity of WCDs that a base station is serving could be computed as a sum of (i) a count of served WCDs that do not meet the at least one predefined MU-MIMO efficiency sharing criterion and (ii) a count of groups of served WCDs, where each group includes WCDs that meet the at least one predefined MU-MIMO efficiency sharing criterion for sharing PRBs with other WCDs of the group.

This process could be implemented by the WCD and/or the base stations. For example, each base station could have service information for its served WCDs indicating the extent to which the served WCDs meet the at least one predefined MU-MIMO efficiency sharing criterion. In practice, for instance, each base station could receive channel state reports from its served WCDs, and the base station or the WCD could analyze these channel state reports to determine the extent to which the base station can share PRBs among some or all of the base station's served WCDs. And the base station or the WCD could then use these determined extents to select which base station will serve the WCD. Further, the base station or the WCD could take into account additional factors as well when selecting which base station will serve the WCD.

Accordingly, in one respect, where the process is applied by a WCD within coverage of multiple base stations, the WCD could (i) determine the extent to which each base station is serving WCDs that meet the at least one predefined sharing criterion, (ii) select one of the base stations based at least on the selected base station's determined extent, and (iii) request service from the selected base station. For instance, the WCD could interrogate each base station for information indicating the extent to which the base station can provide MU-MIMO service to the base station's served WCDs, and the WCD could use this information as a basis for selecting which base station should serve the WCD.

In another respect, where the process is applied by the base station, the base station could (i) identify groups of WCDs that the base station is serving, where the groups are identified based on the WCDs of each group meeting the at least one predefined sharing criterion for sharing PRBs with other WCDs of the group, (ii) determine an effective quantity of WCDs that the base station is serving based at least on a count of the identified groups, and (iii) determine, based at least on the determined effective quantity, whether the base station will serve the WCD.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE as an example air interface protocol and associated network arrangement. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
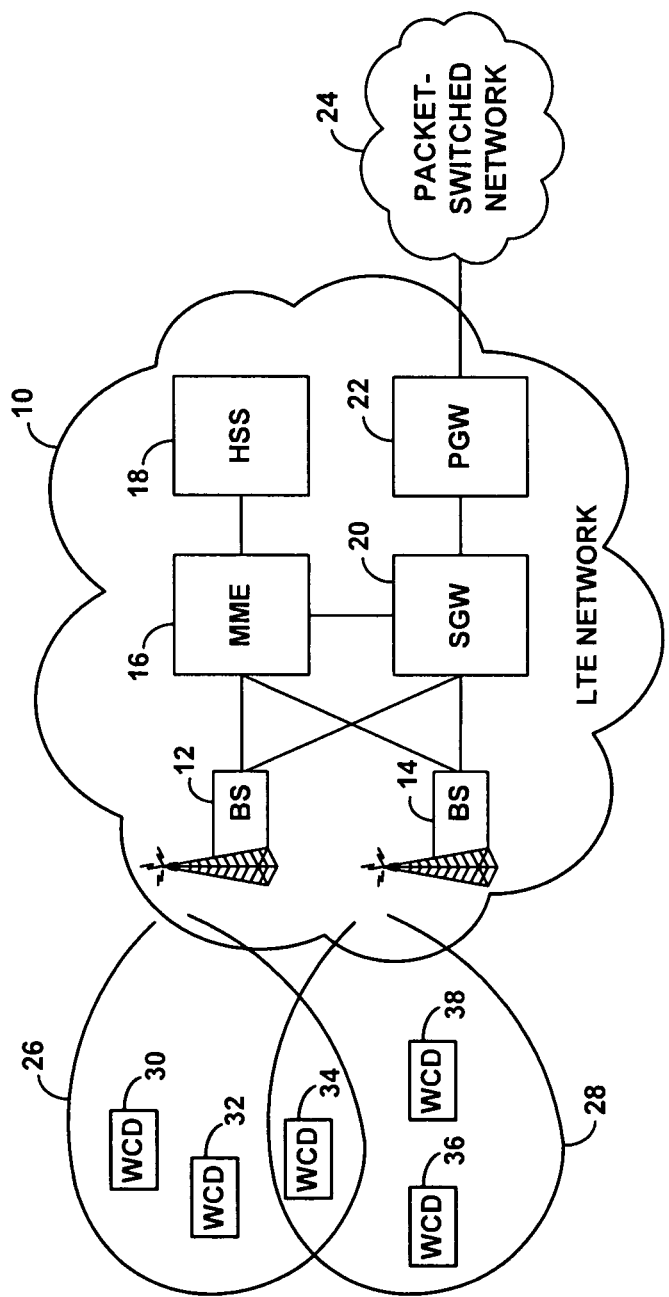
FIG. 1 is a simplified block diagram of a wireless communication system in which the present method and system can be implemented.

Referring to the drawings, as noted above, FIG. 1 is a simplified block diagram of a wireless communication system in which the present method and system can be implemented. In particular, FIG. 1 depicts an LTE network 10, which functions to serve WCDs with wireless packet data communication service, including possibly voice-over-packet service, but may also provide other functions. As shown, the LTE network 10 includes a base station (e.g., LTE evolved Node-B (eNodeB)) 12, which has an antenna structure and associated equipment for providing LTE coverage area 26 in which to serve WCDs. Similarly, the LTE network 10 also includes base station 14 configured to provide coverage area 28. The base stations 12 and 14 each have a communication interface with a mobility management entity (MME) 16 that functions as a signaling controller for the LTE network 10 and has a communication interface with a home subscriber server (HSS) 18. Further, the base stations 12 and 14 each have a communication interface with a serving gateway (SGW) 20, which in turn has a communication interface with a packet-data-network gateway (PGW) 22 that provides connectivity with a packet-switched network 24 such as the Internet, and the MME 18 has a communication interface with the SGW 20. In practice, the illustrated components of the LTE network 10 may sit as nodes on a private packet-switched network owned by an operator of the LTE network 10, and thus the various communication interfaces may be logical interfaces within that network.

In addition, FIG. 1 illustrates five example WCDs 30, 32, 34, 36, 38 within coverage of the base stations 12 and 14. By way of example, WCDs 30, 32, 34 are shown to be within coverage area 26 of the base station 12, and WCDs 34, 36, 38 are shown to be within coverage area 28 of the base station 14. Thus, with this arrangement, base station 12 could serve any of WCDs 30, 32 and/or 34, and base station 14 could serve any of the WCDs 34, 36 and/or 38.

In practice, when any such WCD enters into coverage of base station 12 or 14, the WCD may engage in a process to attach with, hand over to, or otherwise associate with the base station, which may result in establishment of a radio link layer connection (e.g., radio resource control (RRC) connection) over the air between the WCD and the base station and preparation of the network to facilitate serving the WCD. For instance, the WCD may transmit an attach request to the base station, which the base station may forward to the MME, and the MME may then engage in signaling to control setup of one or more bearers for carrying data for the WCD between the PGW and the base station. Further, in this attach process, the WCD may convey to the base station information about the WCD's profile and configuration, and the MME may also receive WCD profile and configuration information from the HSS and convey that information to the base station, and the base station may store this information in a local context record for the WCD. The base station may then serve the WCD, scheduling downlink and uplink communications as discussed above for instance. In particular, if the base station receives from the SGW data to be transmitted to the WCD, the base station may schedule and engage in transmission of the data to the WCD using an appropriate modulation scheme. And if the WCD requests transmission of data to the base station, the base station may schedule transmission of the data from the WCD, and the WCD may transmit the data accordingly.

Further, when a base station enables MU-MIMO service, the base station could share PRBs among multiple WCDs in line with the discussion above. By way of example, base station 12 may include multiple antennas configured to define coverage area 26. With this arrangement, if base station 12 enables MU-MIMO service for WCDs 30 and 32, then base station 12 could schedule a set of downlink PRBs for downlink traffic to WCD 30 via a first antenna, and schedule the same set of downlink PRBs for downlink traffic to WCD 32 via a second antenna. As another example, base station 14 may include multiple antennas configured to define coverage area 28. Thus, with this arrangement, base station 14 could schedule a set of uplink PRBs for uplink traffic from WCD 34, and schedule the same set of uplink PRBs for uplink traffic from WCD 36 and/or WCD 38.

As noted above, when a WCD is within coverage of multiple base stations, the present disclosure provides for controlling which base station will serve the WCD based on consideration of the extent to which the base station can provide MU-MIMO service efficiently. To do so, this process may involve identifying, for each base station, one or more groups of WCDs within coverage of the base station, where each group is identified based on the WCDs of the group meeting at least one predefined MU-MIMO efficiency sharing criterion for sharing PRBs with other WCDs of the group.

One example criterion may be that a group of WCDs identified for receiving MU-MIMO service should have at least a threshold high signal quality. The theory here is that if the WCDs of the group have a poor signal quality without MU-MIMO, then additional interference introduced when MU-MIMO service is enabled could further deteriorate the already poor signal quality, thereby reducing the efficiency of the base station.

However, in some scenarios, even if multiple WCDs each have a high signal quality on a particular channel, enabling MU-MIMO service for those WCDs could still lead to a deterioration of the base station's efficiency. By way of example, for uplink MU-MIMO, a base station may be configured to separate combined uplink data streams transmitted by a group of WCDs on shared PRBs. To do this, the base station could use an encoding modulation scheme, such as a demodulation reference signal (DMRS), associated with an uplink data stream from a first WCD as a basis for separating the first WCD's uplink data stream from other uplink data streams transmitted by other WCDs. However, if a second WCD assigned to the same shared PRBs is using a similar DMRS, then the reliability of using DMRS as a basis for separating the uplink data streams from the two WCDs may be reduced. Thus, even if the first WCD and the second WCD each have a high signal quality on a wireless channel, the first WCD and the second WCD may be less suitable for sharing PRBs in that channel than other WCDs that are using relatively different encoding modulation schemes to encode their respective uplink data streams. WCDs using relatively similar encoding modulation schemes are typically described as having "low channel orthogonality," and WCDs using relatively different encoding modulation schemes are described as having "high channel orthogonality."

Accordingly, another example predefined sharing criterion may be that a group of WCDs identified for receiving MU-MIMO service should have at least a threshold high channel orthogonality.

To facilitate applying these predefined sharing criteria in practice, for instance, a base station could use channel state reports determined for some or all of its served WCDs. The channel state reports could specify various channel state metrics, such as any of the channel state metrics conventionally reported in an LTE or other system, and/or any other channel state metrics now known or later developed. By way of example, in LTE, a WCD may be configured to report channel state information (CSI) for downlink communication, such as channel quality information (CQI) (e.g., a value corresponding with measured signal-to-interference-plus-noise-ratio (SINR) across the serving carrier or in particular sub-bands of the carrier), precoding matrix indicators (PMI) (indicating preferred weights to be applied during precoding to help optimize SINR), and rank indicator (RI) (indicating preferred transmission mode). Alternatively or additionally, the base station could similarly determine CSI for uplink communication as well.

Thus, in an example scenario where WCDs 30, 32, 34, 36, 38 are the only WCDs within coverage of base stations 12 and 14, at issue is which base station should serve WCD 34 (positioned within coverage area 26 of base station 12 and within coverage area 28 of base station 14). In the scenario, if the CQIs of WCDs 30 and 32 indicate that those WCDs have at least a threshold high SINR on a particular wireless channel, then WCDs 30 and 32 may be deemed to satisfy the first criterion (threshold high signal quality). The threshold SINR may be any predefined value, such as 15 decibels, 22 decibels, or any other value. Further, if the PMIs of WCDs 30 and 32 indicate that the preferred precoding sequences for those WCDs are sufficiently orthogonal, then WCDs 30 and 32 may be deemed to satisfy the second criterion (threshold high channel orthogonality). In line with the discussion above, for instance, the precoding sequences indicated in the reported PMIs could be used as a basis for generating respective encoding modulation schemes (e.g., DMRS) used to encode the respective data streams transmitted to or from WCDs 30 and 32.

Thus, continuing with the scenario, base station 12 could be deemed to be effectively serving a group of WCDs (i.e., WCDs 30 and 32) as one WCD, as WCDs 30 and 32 meet both predefined sharing criteria for receiving MU-MIMO service efficiently. For instance, if base station 12 needs to free PRBs for scheduling to any of its served WCDs, then base station 12 could enable MU-MIMO service efficiently for sharing PRBs among WCDs 30 and 32. By doing so, for instance, base station 12 could schedule fewer PRBs for serving both WCDs 30 and 32 than it would otherwise schedule without MU-MIMO service.

Further, in the scenario, if the CQIs of WCDs 36 and 38 indicate that those WCDs have less than the threshold high SINR, then WCDs 36 and 38 may be deemed as not satisfying the first criterion (threshold high signal quality). Alternatively or additionally, if the PMIs of WCDs 36 and 38 indicate that the preferred precoding sequences for those WCDs are not sufficiently orthogonal, WCDs 36 and 38 could be deemed as not satisfying the second criterion (threshold high channel orthogonality), and thus WCDs 36 and 38 may be unsuitable for receiving MU-MIMO service efficiently. In turn, base station 14 could be deemed to be effectively serving WCDs 36 and 38 as two WCDs. And in this scenario, WCD 34 would be served by base station 12, as base station 12 could effectively serve fewer WCDs than base station 14 if base station 12 enables MU-MIMO service for WCDs 30 and 32.

Thus, the present disclosure provides for determining the extent to which a base station can provide MU-MIMO service efficiently based on how many WCDs within coverage of the base station meet any combination of predefined sharing criteria, including one or more of the criteria described above and/or any other criteria now known or later developed.

As noted above, in various embodiments, when a WCD is within coverage of multiple base stations, a base station could be selected to serve the WCD based on the base station "effectively serving" fewer WCDs than the other base stations according to the extent to which the base station can provide MU-MIMO service efficiently. In particular, a quantity of WCDs effectively served by a base station may be computed as a sum of (i) a count of groups of WCDs identified by the base station at least based on the WCDs of each group meeting the at least one predefined MU-MIMO efficiency sharing criterion and (ii) a count of WCDs that do not meet the at least one predefined sharing criterion. As a specific example of this, consider a scenario where a base station is serving seven WCDs A, B, C, D, E, F, G. In this scenario, the base station may identify two groups of those WCDs that meet the predefined criteria in line with the discussion above. For instance, a first group may include WCDs A, B, C, and a second group may include WCDs F, G. Further, in this scenario, each of the WCDs D, E, F do not meet the at least one predefined sharing criterion for sharing PRBs efficiently with any of the WCDs served by the base station. Thus, in this scenario, the base station may determine that it is effectively serving five WCDs based on a sum of (i) two identified groups (the first group and the second group) that include WCDs meeting the at least one predefined criterion and (ii) three WCDs (D, E, F) that do not meet the at least one predefined criterion.

To facilitate this in practice, for instance, each base station could periodically receive channel state reports from its served WCDs, and could analyze these reports to determine a count of groups of WCDs served by the base station that meet the MU-MIMO efficiency criteria, and a count of WCDs served by the base station that do not meet the criteria. And each base station could then determine the effective quantity of WCDs it is serving (if MU-MIMO service is enabled) as discussed above. The base station could then store and update data indicating the determined effective quantity of WCDs, perhaps in context records for the WCDs. Alternatively, the base station could send this data to the MME or to its served WCDs. And the MME or the WCDs could then store this data.

As noted above, the present disclosure provides for taking into account other factors as well when selecting which base station will serve a WCD. By way of example, the selection could be conditioned on whether the WCD at issue meets the at least one predefined sharing criterion for sharing PRBs with at least one other WCD served by the base station. In an example scenario, if WCD 34 can share PRBs with WCDs 36 and/or 38 efficiently based on WCD 34 meeting the at least one criterion, then base station 14 could free PRBs for serving WCD 34 by grouping WCD 34 with one or more of WCDs 36 and/or 38 and enabling MU-MIMO service to share PRBs among those grouped WCDs. Thus, in this scenario, base station 14 could be selected to serve WCD 34.

Further, the selection of which base station should serve a WCD could also be conditioned on whether the WCD is configured to provide at least one other device with connectivity to the base station. As such, in various embodiments, the disclosure draws a distinction between WCDs operating as endpoint (e.g., end-user) devices, such as cell phones or wirelessly equipped computers, and WCDs operating as relays between the base station and one or more other devices, such as if the WCDs are operating as hotspots or device-to-device intermediaries or the like. The theory here is that if a WCD is operating as a relay, then the WCD may request PRBs for one or more devices as well as possibly PRBs for the WCD itself. And the base station's carriers could thus be more likely to become congested. Whereas, if the WCD is operating as an endpoint device, then the WCD may request relatively fewer PRBs than a relay WCD, and the base station's carriers could thus be less likely to become congested. Thus, with this condition for instance, the process described above for selecting which base station should serve a WCD could be carried out in response to a determination that the WCD is a relay.

To facilitate this in practice, for instance, each WCD may store profile, configuration, or status data that specifies whether the WCD provides connectivity for at least one other device. For instance, the WCD could store data that indicates whether the WCD is the type of device that provides such connectivity (e.g., an indication of whether the WCD is configured, connected, or otherwise arranged to operate as a relay, hotspot, or D2D) or is rather just an endpoint device. In addition, base station 12 and/or 14 may also store such profile, configuration, or status data respectively for each of their served WCDs. The base station could receive some of this data from the WCD or from the MME, perhaps when the WCD initially attaches with the base station, and the base station could store the data in a context record for the WCD. Further, as the WCD's configuration or status changes, such as if the WCD transitions between being an endpoint WCD to being a relay, the base station could receive updated data indicating the change. For instance, when a WCD transmits a channel state report, the WCD could conveniently include in or with that report an indication of whether the WCD provides connectivity to one or more other devices, and the base station could update its records for the WCD accordingly.

In an example scenario, WCD 34 or base station 12 or 14 could use this data to determine whether WCD 34 is a relay, and if so WCD 34 could be served by the base station effectively serving fewer WCDs when MU-MIMO service is enabled, in line with the discussion above. Whereas, for instance, if WCD 34 is rather just an endpoint device, then WCD 34 could be served by the base station having the most reliable air interface conditions for serving WCD 34 even if that base station is effectively serving more WCDs (when MU-MIMO service is enabled).

Further, the selection of which base station should serve a WCD could also be conditioned on how many WCDs currently served by the base station are relays. As noted above, a relay WCD may be likely to request more PRBs than an endpoint WCD, as the relay may request PRBs for one or more devices connected to the relay as well as possibly PRBs for the relay itself. For instance, if a base station is currently serving one or more relays, the base station may be more likely to become congested than another base station that is currently serving fewer relays. Thus, with this condition for instance, the base station effectively serving fewer WCDs (e.g., when MU-MIMO service is enabled as described above) may be selected to serve the WCD only if the base station is serving less than a threshold quantity of relays.

Further, the selection of which base station should serve a WCD could also be conditioned on whether the selected base station has at least a threshold high signal quality for wireless communication with the WCD. For instance, if base station 12 has poor air interface conditions for serving WCD 34, WCD 34 could be served by base station 14 even if base station 12 is effectively serving fewer WCDs than base station 14 when MU-MIMO service is enabled in line with the discussion above.

The present method could be applied with respect to any or all of these conditions for selecting which base station should serve a WCD. In practice, for instance, a WCD can periodically scan its environment for wireless signals from one or more base stations. When the WCD detects that it is within coverage of multiple base stations, the WCD or a base station or other entity could then apply the present method to determine which of the multiple base stations will serve the WCD.

To do this in practice, for instance, the WCD or base station or other network entity could determine or receive data associated with one or more of these conditions, such as data indicating the effective quantity of WCDs served by each base station (if MU-MIMO service is enabled), data indicating whether the WCD is a relay, data indicating whether any of the WCDs served by each base station is a relay, and/or data indicating signal quality between the WCD and each base station (e.g., channel state reports). And the WCD or base station or other network entity could then use this data as a basis for selecting which base station will serve the WCD in line with the discussion above.

Thus, if the WCD performs this method, the WCD could then send a registration or "attach" request to the selected base station, or perhaps a request for "handover" of service from another base station currently serving the WCD to the selected base station. Whereas, for instance, if a base station performs this method, the base station could transmit to the WCD (e.g., in an RRC connection reconfiguration message or other control message) a directive interpretable by the WCD to cause the WCD to attach with the selected base station. And the WCD may then operate accordingly.

Figure 2:
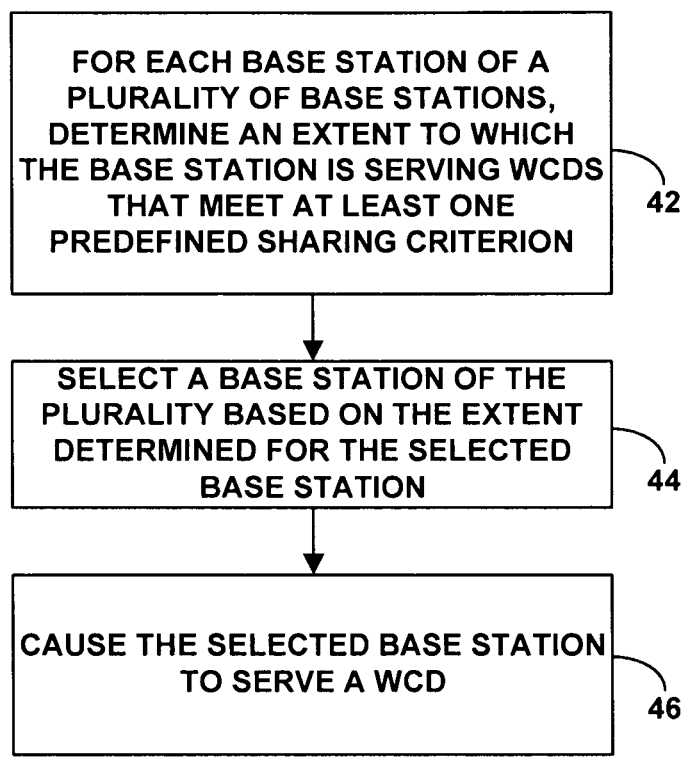
FIG. 2 is a flow chart depicting example operations in accordance with the disclosure.

FIG. 2 is next a flow chart depicting features of a representative method for controlling which base station of a plurality of base stations will serve a WCD. As shown in FIG. 2, at block 42, the method includes determining, for each base station, an extent to which the base station is serving WCDs that meet at least one predefined MU-MIMO efficiency sharing criterion. At block 44, the method then includes, based on the determined extent, selecting a base station from the plurality for serving the WCD. And at block 44, the method includes causing the selected base station to serve the WCD.

In line with the discussion above, this method could be carried out by the WCD, by the base station, or by one or more other entities such as the MME 16 or the SGW 20 for example. Further, the extent to which a base station is serving WCDs that meet at least one predefined MU-MIMO efficiency sharing criteria could define an effective quantity of WCDs served by the base station if MU-MIMO service is enabled. In line with the discussion above, the effective quantity of WCDs could be determined as a sum of (i) a count of WCDs that do not meet the at least one predefined sharing criterion and (ii) a count of groups of served WCDs, where each group includes WCDs that meet the at least one predefined sharing criterion for sharing PRBs with other WCDs of the group.

Further, this method may also involve causing the selected base station to enable MU-MIMO service for at least one group of WCDs served by the selected base station. For instance, if the selected base station is serving a group of WCDs that meet the at least one predefined sharing criterion but are not currently using shared PRBs, then the selected base station could begin scheduling shared PRBs to that group of WCDs. For instance, the selected base station could transmit to each WCD of the group (e.g., in an RRC connection reconfiguration message or other control message) an indication of the scheduled shared PRBs. By doing so, for instance, the group of WCDs could be served with fewer PRBs. And thus the selected base station may have more PRBs available for scheduling.

Figure 3:
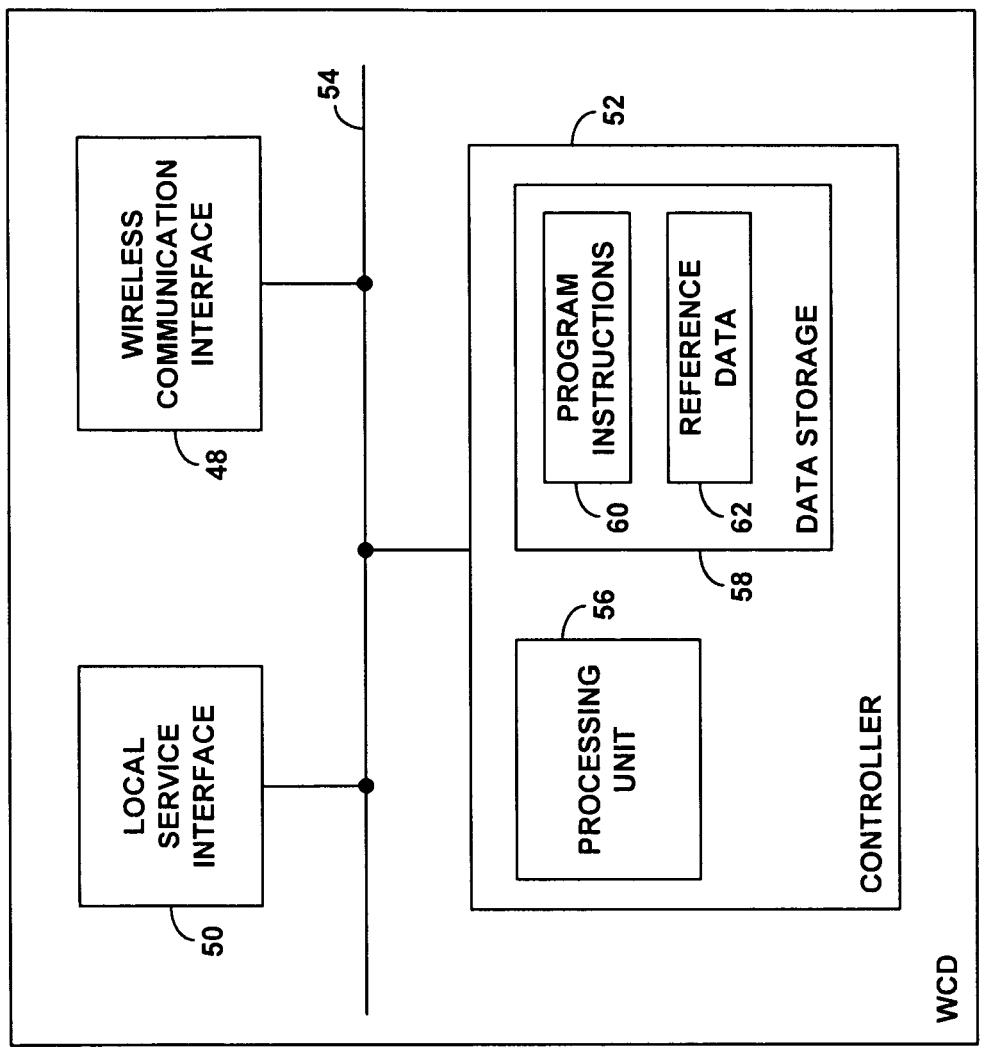
FIG. 3 is simplified block diagram of an example WCD operable in accordance with the disclosure.

FIG. 3 is next a simplified block diagram of a WCD, showing some of the components that such a device could include in accordance with an example implementation. In particular, the example WCD is configured to dynamically control which base station will serve the WCD. As shown in FIG. 3, the example WCD includes a wireless communication interface 48, local service interface 50, and a controller 52, all of which could be coupled together or otherwise interconnected by a system bus, network, or other connection mechanism 54. Further, these or other components of the WCD could be integrated together in various ways. For instance, the controller could be provided as logic on a chipset that also serves as at least part of the wireless communication interface or local service interface. And the wireless communication interface and local service interface could be combined together. Alternatively, if the WCD is configured as an endpoint device rather than a relay-type device, the WCD could be implemented without the local service interface 50 altogether. Further, the WCD could include other components and take other forms. For instance, if the WCD is user operated, the WCD could also include a user interface. Other examples are possible as well.

In the example WCD, the wireless communication interface 48 could be configured to engage in wireless communication with a plurality of base stations via wireless channels between the WCD and each base station. As such, the wireless communication interface could include a radio compliant with the protocol that the WCD will use for communication with the base station, such as LTE for instance, and could further include an antenna structure for transmitting and receiving via the wireless channel.

The local service interface 50 could be configured to engage in communication directly or indirectly with one or more other devices. Further, the local service interface could provide for wired and/or wireless communication with the one or more other devices. For instance, the local service interface could include a wireless communication interface that operates to communicate with one or more other entities over the same air interface protocol used by wireless communication interface 48 or over a different air interface protocol. (By way of example, the wireless communication interface 48 could communicate with the serving base station according to LTE, and the local service interface 50 could communicate with other devices using LTE or using WiFi.) Alternatively, the local service interface could be configured for connection with a wired link such as an Ethernet connection or other cable connection.

With these interfaces, the WCD could operate to be served by, and thus communicate data to and from, its serving base station on the one hand and to communicate data to and from one or more other devices on the other hand. Thus, the WCD could function as an intermediary providing connectivity between the one or more other devices and the base station.

The controller 52, in turn, could be configured to control operation of the WCD including implementing various WCD operations described herein. As shown by way of example, the controller could include a processing unit 56 and data storage 58. Processing unit 56 could comprise one or more general purpose processors (e.g., microprocessors) and/or one or more special-purpose processors (e.g., application specific integrated circuits or digital signal processors). And data storage 58 could comprise one or more non-transitory volatile and/or non-volatile storage components, such as magnetic, optical, or flash memory, and could hold or be encoded with program instructions 60 and reference data 62. Program instructions 60 could be executable by processing unit 56 to carry out various WCD operations described herein. And reference data 62 could include various data to facilitate carrying out the operations, such as data indicating whether the WCD provides connectivity between its serving base station and one or more other devices, and data identifying the extent to which a plurality of base stations detected by the WCD can provide MU-MIMO service efficiently.

Figure 4:
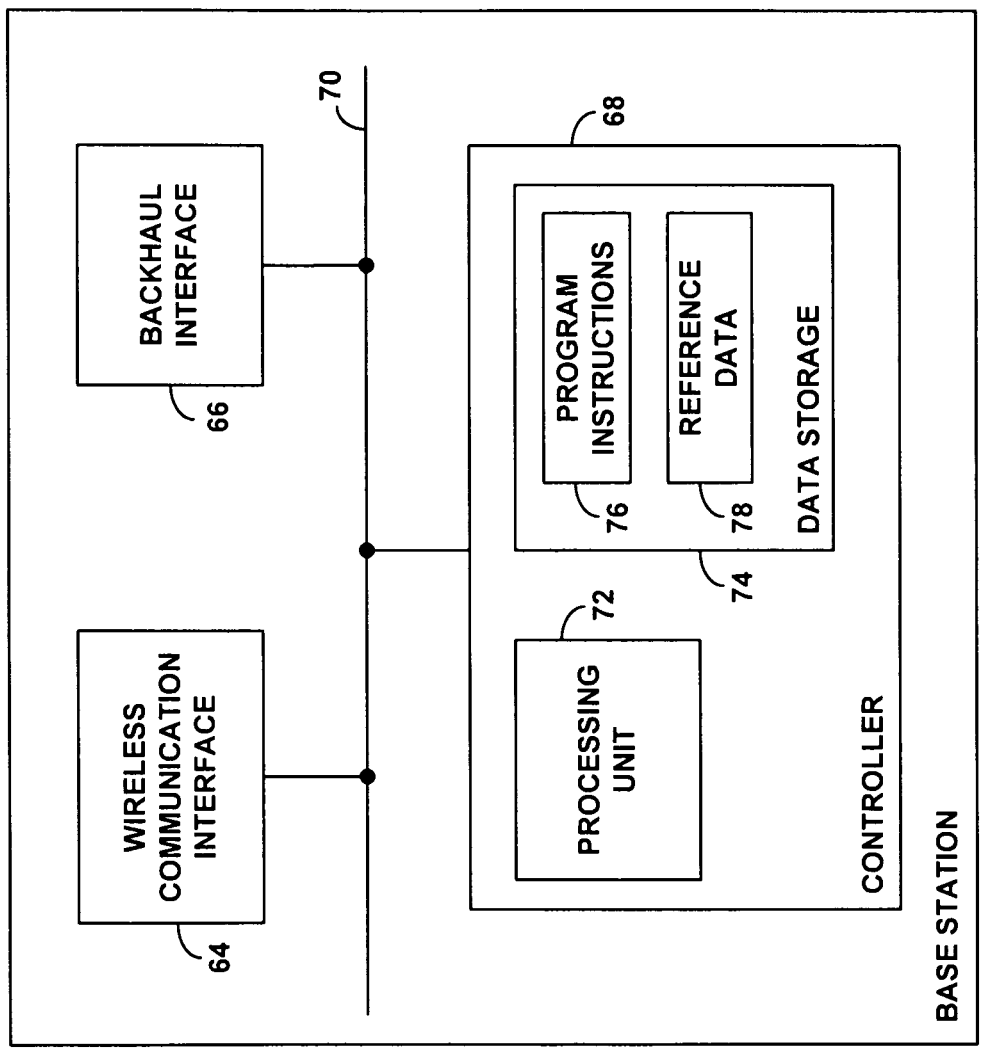
FIG. 4 is simplified block diagram of an example base station operable in accordance with the disclosure.

FIG. 4 is next a simplified block diagram of a base station (such as base station 12 or 14), showing some of the components that such an entity could include in accordance with an example implementation. In particular, the example base station may be configured to control which of a plurality of base stations will serve a WCD. The example base station could be a macro base station of the type that typically includes a tower top antenna structure and provides a broad range of coverage, or the base station could be a small cell base station (e.g., femtocell, mini-macro, or the like) that typically has a smaller form factor and provides a narrower range of coverage. Under LTE, the base station could be an eNodeB. Under other protocols, the base station could take other forms.

As shown in FIG. 4, the example base station includes a wireless communication interface 64, a backhaul interface 66, and a controller 68, all of which could be coupled together or otherwise interconnected by a system bus, network, or other connection mechanism 70. Further, the various components of the base station could be integrated together in various ways.

In the example base station, the wireless communication interface 64 could be configured to engage in wireless communication with a served WCD via a wireless channel between the base station and the WCD. As such, the wireless communication interface could include a radio compliant with the protocol that the base station will use for communication with the WCD station, such as LTE for instance, and could further include an antenna structure for transmitting and receiving via the wireless channel. To support MU-MIMO service in line with the discussion above, the antenna structure could include multiple antennas to allow the base station to employ spatial multiplexing. The backhaul interface 66 could then be a wired or wireless interface for communicating with various core network entities, such as with an SGW and MME as discussed above for instance. For instance, under the LTE protocol, backhaul interface 66 may include an S1 interface to facilitate signaling with the MME and/or SGW, and an X2 interface to facilitate signaling with other base stations.

The controller 68, in turn, could be configured to control operation of the base station including implementing various base station operations described herein. As shown by way of example, the controller 68 could include a processing unit 72 and data storage 74. Processing unit 72 could comprise one or more general purpose processors (e.g., microprocessors) and/or one or more special-purpose processors (e.g., application specific integrated circuits or digital signal processors). And data storage 74 could comprise one or more non-transitory volatile and/or non-volatile storage components, such as magnetic, optical, or flash memory, and could hold or be encoded with program instructions 76 and reference data 78. Program instructions 76 could be executable by processing unit 72 to carry out various base station operations described herein. And reference data 78 could include various data to facilitate carrying out the operations, such as data indicating channel states for each of the base station's served WCDs, and data indicating which of the served WCDs can be grouped for efficient MU-MIMO service in line with the discussion above.

In line with the discussion above, when a WCD is within coverage of a plurality of base stations including this base station, the base station could determine effective quantities of WCDs served by the plurality of base stations (e.g., if MU-MIMO service is enabled). To do this, for instance, the base station could receive a computation of the effective quantities served by the other base stations from the WCD via the wireless communication interface 64. Alternatively, the base station could receive this information from the other base stations directly or via other network entities (e.g., MME or SGW) over backhaul interface 66. In LTE, for instance, the base station could request this information from the other base stations using the X2 interface of backhaul interface 66, and the other base stations could then provide this information over the X2 interface.

Exemplary embodiments have been described above. Those skilled in the art will understand, however, that changes and modifications may be made to these embodiments without departing from the true scope and spirit of the invention.

What is claimed is:

1. In a wireless communication system comprising a plurality of base stations, a method of controlling which base station will serve a wireless communication device (WCD), wherein each base station is configured to provide service on a respective radio frequency air interface defining a plurality of physical resource blocks (PRBs), and wherein at least one base station of the plurality supports multi-user multiple-input multiple-output (MU-MIMO) service for sharing PRBs among WCDs that meet at least one predefined sharing criterion, the method comprising:
    determining, for each base station of the plurality, a count of groups of WCDs served by the base station, the WCDs of each group meeting the at least one predefined sharing criterion for sharing PRBs with other WCDs of the group according to the MU-MIMO service supported by the base station;
    determining, for each base station of the plurality, an effective quantity of WCDs that the base station is serving based on at least the determined count of groups;
    selecting a base station of the plurality based on at least the selected base station having a lowest determined effective quantity; and
    causing the selected base station to serve the WCD.

2. The method of claim 1, wherein determining the effective quantity of WCDs for each base station comprises:
    determining a count of WCDs served by the base station that do not meet the at least one predefined sharing criterion for sharing PRBs with at least one other WCD served by the base station; and
    computing the effective quantity based on a sum of (i) the count of groups of WCDs meeting the at least one predefined sharing criterion and (ii) the count of WCDs not meeting the at least one predefined sharing criterion.

3. The method of claim 1, wherein the at least one predefined sharing criterion includes a threshold high channel orthogonality between WCDs of a group, wherein the channel orthogonality is for a wireless channel communicatively linking the base station with the WCDs of the group.

4. The method of claim 1, wherein the at least one predefined sharing criterion includes a threshold high signal quality for each WCD in a group, wherein the signal quality is for a wireless channel communicatively linking the base station with the WCDs of the group.

5. The method of claim 1, further comprising:
determining whether a group of WCDs meets the at least one predefined sharing criterion based on channel state information (CSI) obtained for each WCD of the group, wherein the CSI is for a wireless channel communicatively linking the base station with the WCDs of the group.

6. The method of claim 1, wherein the WCD is a relay, and wherein the method is carried out in response to the WCD being a relay.

7. The method of claim 1, further comprising:
determining, for each base station, a quantity of relays served by the base station, wherein selecting the base station is based also on the selected base station serving fewer than a threshold quantity of relays.

8. The method of claim 1, wherein selecting the base station is based also on whether the WCD meets the at least one predefined sharing criterion for sharing PRBs with at least one other WCD that the selected base station is serving.

9. The method of claim 1, further comprising:
identifying the plurality of base stations based on each base station of the plurality having at least a threshold high signal quality for wireless communication between the base station and the WCD.

10. The method of claim 1, further comprising:
causing the selected base station to serve at least one group of WCDs with MU-MIMO service.

11. The method of claim 1, further comprising:
after causing the selected base station to serve the WCD, detecting a change to the effective quantity of WCDs that one of the plurality of base stations is serving;
responsive to the detecting of the change, selecting another base station of the plurality to serve the WCD based on the other base station having the lowest determined effective quantity after the detected change; and
causing the other base station to serve the WCD.

12. A wireless communication device (WCD) configured to dynamically control which base station of a plurality of base stations will serve the WCD, wherein each base station is configured to provide service on a respective radio frequency air interface defining a plurality of physical resource blocks (PRBs), and wherein at least one base station of the plurality supports multi-user multiple-input multiple-output (MU-MIMO) service for sharing PRBs among WCDs that meet at least one predefined sharing criterion, the WCD comprising:
a wireless communication interface configured to engage in wireless communication with the plurality of base stations; and
a controller, wherein the controller is configured to (i) determine, for each base station of the plurality, a respective extent to which the base station is serving WCDs that meet the at least one predefined sharing criterion for sharing PRBs according to the MU-MIMO service supported by the base station, (ii) select a base station of the plurality based on at least the respective extent determined for the selected base station, and (iii) cause the selected base station to serve the WCD.

13. The WCD of claim 12, wherein the controller is further configured (a) to receive, via the wireless communication interface, respectively from each base station of the plurality, data indicating (i) a first count of groups of WCDs served by the base station, the WCDs of each group meeting the at least one predefined sharing criterion for sharing PRBs with other WCDs of the group according to the MU-MIMO service supported by the base station and (ii) a second count of WCDs served by the base station that do not meet the at least one predefined sharing criterion, and (b) to determine, respectively for each base station of the plurality, an effective quantity of WCDs that the base station is serving based on a sum of the first count and the second count,
wherein determining, for each base station of the plurality, the respective extent is based on the effective quantity determined respectively for the base station, and
wherein selecting the base station is based on the selected base station having a lowest determined effective quantity.

14. The WCD of claim 13, wherein the data received, respectively from each base station of the plurality, includes a computation of the effective quantity for the base station, wherein determining the respective effective quantity comprises reading the computation from the received data, and
wherein the controller is further configured to request, via the wireless communication interface, the computation of the effective quantity respectively from each base station of the plurality.

15. The WCD of claim 12, wherein the controller is further configured (i) to determine whether the WCD is a relay and (ii) to select the base station based also on whether the WCD is a relay.

16. The WCD of claim 12, wherein selecting the base station is based also on whether the WCD meets the at least one predefined sharing criterion for sharing PRBs between the WCD and at least one other WCD served by the selected base station.

17. The WCD of claim 12, wherein the controller is further configured to identify, via the wireless communication interface, the plurality of base stations based on each base station having at least a threshold high signal quality for wireless communication between the base station and the WCD.

18. A base station configured to provide service on a radio frequency air interface defining a plurality of physical resource blocks (PRBs), wherein the base station supports multi-user multiple-input multiple-output (MU-MIMO) service for sharing PRBs among wireless communication devices (WCDs) that meet at least one predefined sharing criterion, the base station comprising:
a wireless communication interface configured to communicate with a WCD via a wireless channel between the base station and the WCD; and
a controller, wherein the controller is configured to (i) identify groups of WCDs served by the base station, the WCDs of each group meeting the at least one predefined sharing criterion for sharing PRBs with other WCDs of the group according to the MU-MIMO service supported by the base station, (ii) determine an effective quantity of WCDs that the base station is serving based on at least a count of the identified groups, and (iii) cause the base station to serve the WCD based on at least the determined effective quantity.

19. The base station of claim 18, wherein the controller is further configured:
(i) to receive data that relates to one or more other base stations, the received data indicating, for each base station of the other base stations, a respective effective quantity of WCDs that the other base station is serving, and
(ii) to cause the base station to serve the WCD based on the base station having a lower determined effective quantity than each respective effective quantity indicated in the received data for the other base stations.

20. The base station of claim 19, wherein the data is received from the WCD via the wireless interface.

* * * * *